July 18, 1961
R. A. PATTERSON
2,992,653
VALVE FOR PRESSURE INDICATING DEVICE
Filed May 26, 1958
4 Sheets-Sheet 1
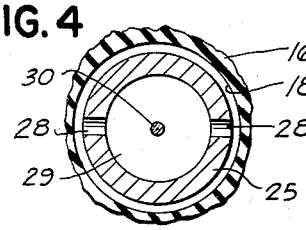
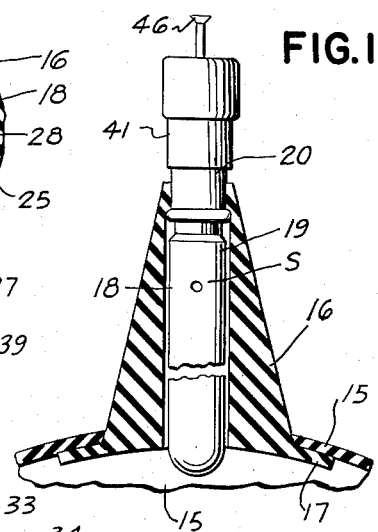
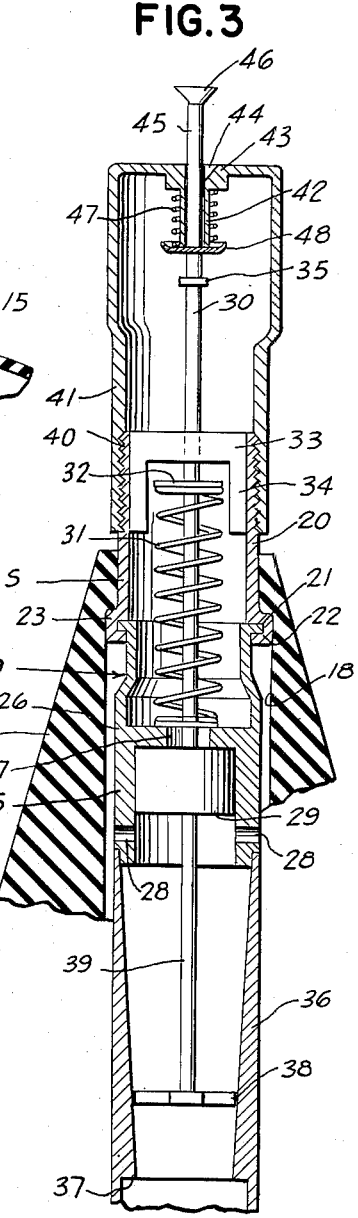
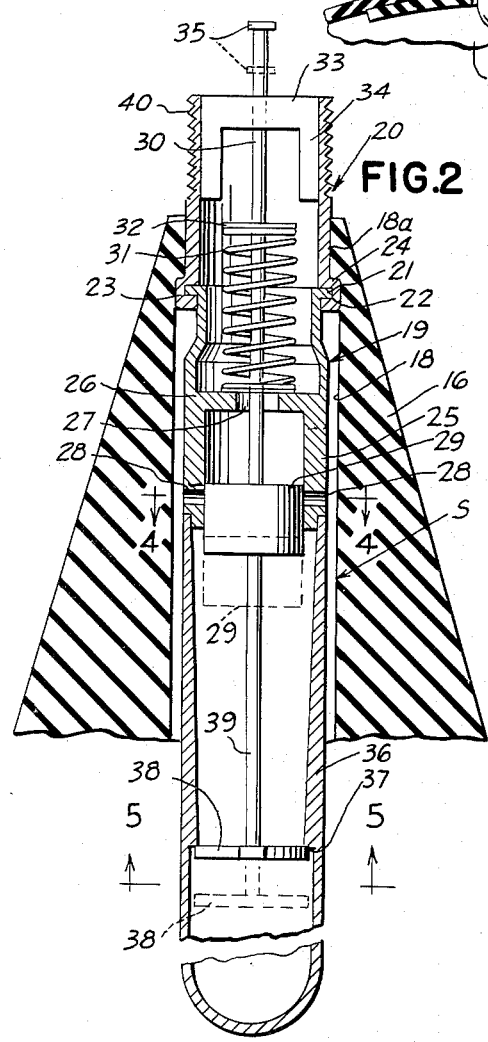
INVENTOR.
Robert A. Patterson
BY Robert R. Churchill
ATTORNEY

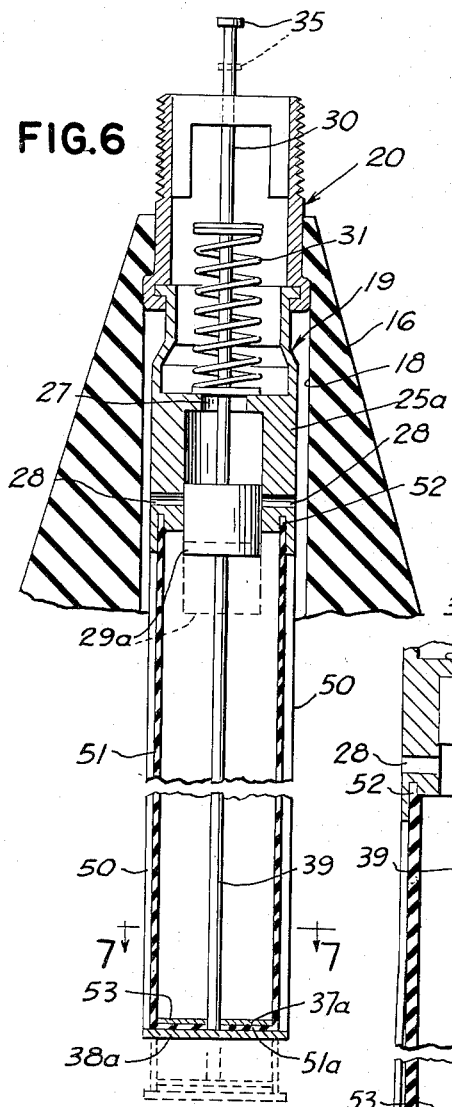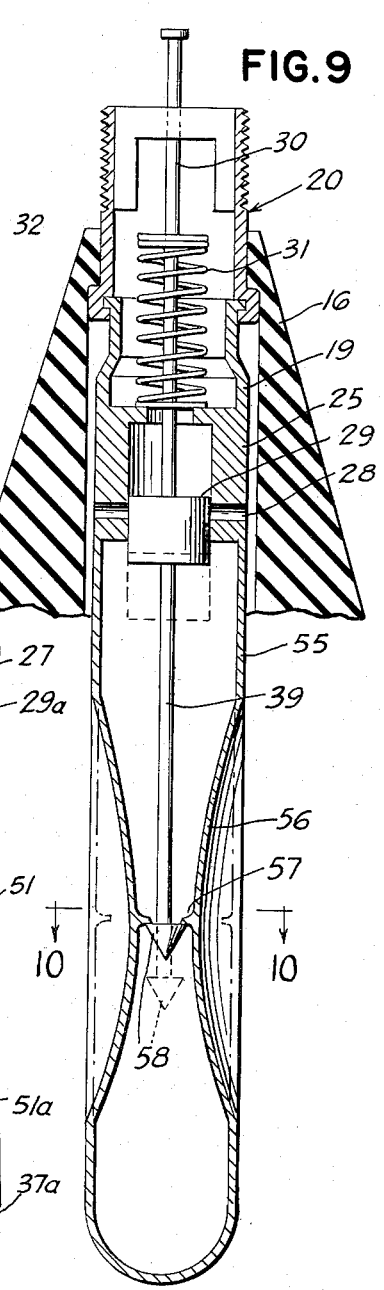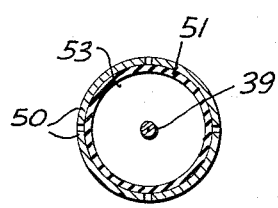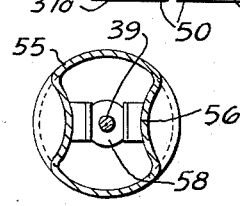

July 18, 1961  R. A. PATTERSON  2,992,653
VALVE FOR PRESSURE INDICATING DEVICE
Filed May 26, 1958  4 Sheets-Sheet 3

INVENTOR.
Robert A. Patterson
BY Robert P. Churchill
ATTORNEY

July 18, 1961 R. A. PATTERSON 2,992,653
VALVE FOR PRESSURE INDICATING DEVICE
Filed May 26, 1958 4 Sheets-Sheet 4

INVENTOR.
Robert A. Patterson
BY
Robert R. Churchill
ATTORNEY

United States Patent Office 2,992,653
Patented July 18, 1961

2,992,653
VALVE FOR PRESSURE INDICATING DEVICE
Robert A. Patterson, Alhambra, Calif.
(Big Bass Lake, Eagle River, Wis.)
Filed May 26, 1958, Ser. No. 737,951
13 Claims. (Cl. 137—228)

My invention relates to valves for expansible chambers such as pneumatic tires which as presently constructed require removal of the valve cap and the application of an air pressure gauge to the valve stem in order to determine if the air pressure in a tire is below the proper or safe pressure for use on the wheel of a vehicle.

It is a purpose of my invention to provide a valve structure for pneumatic tires which has incorporated therein signaling means for visibly indicating automatically when the air pressure in the tire is below its proper pressure, thus eliminating removal of the valve cap and the application of an air pressure gauge.

It is also a purpose of my invention to provide a tire valve structure in which the aforesaid signaling means is located in the valve cap, and by a latch means is held in a retracted or non-indicating position against the action of an urging means, and movable by said urging means to a projecting or indicating position, the valve structure including a means responsive to a reduction of air pressure in the tire to actuate the latch means so as to unlatch the signaling means, thus allowing it to be moved to indicating position by the urging means.

A further object of my invention is the provision of a tire valve structure wherein the latch means is movable to non-latching position by the provision of a means which is inflatable concurrently with inflation of the tire and to an air pressure corresponding to that to which the tire is inflated so as to retain the latch means in latching position with respect to the signaling means, but movable when the air pressure in the tire falls below that of the air pressure in said means to unlatch the signaling means, thereby permitting the latter to be moved to projected or indicating position and thus visibly indicating the fall of air pressure in the tire.

A still further object of the invention is to provide a novel and improved valve structure of the character specified which may be interchangeably fitted into the conventional valve supporting nipple of a standard tubeless tire whereby the conventional valve unit may be replaced by the present novel valve structure.

I will describe only four forms of pneumatic tire valve structures, each embodying my invention, and will then point out the novel features thereof in claims.

In the accompanying drawings:

FIG. 1 is a view showing one form of tire valve structure embodying my invention as applied to a tire;

FIG. 2 is an enlarged vertical sectional view of the tire valve structure shown in FIG. 1, the valve cap being omitted.

FIG. 3 is a view similar to FIG. 2 with the valve cap applied, and the signaling means in projected or indicating position;

FIG. 4 is a transverse sectional view taken on the line 4—4 of FIG. 2;

FIG. 5 is a transverse sectional view taken on the line 5—5 of Fig. 2;

FIG. 6 is a view similar to FIG. 2 showing another form of tire valve structure embodying my invention;

FIG. 7 is a transverse sectional view taken on the line 7—7 of FIG. 6;

FIG. 8 is a fragmentary sectional view of the structure shown in FIG. 6 but showing the latch means thereof in released position and certain other parts in corresponding positions;

FIG. 9 is a view similar to FIG. 6 showing a third form of tire valve structure embodying my invention;

FIG. 10 is a transverse sectional view taken on the line 10—10 of FIG. 9;

Figures 11, 12:
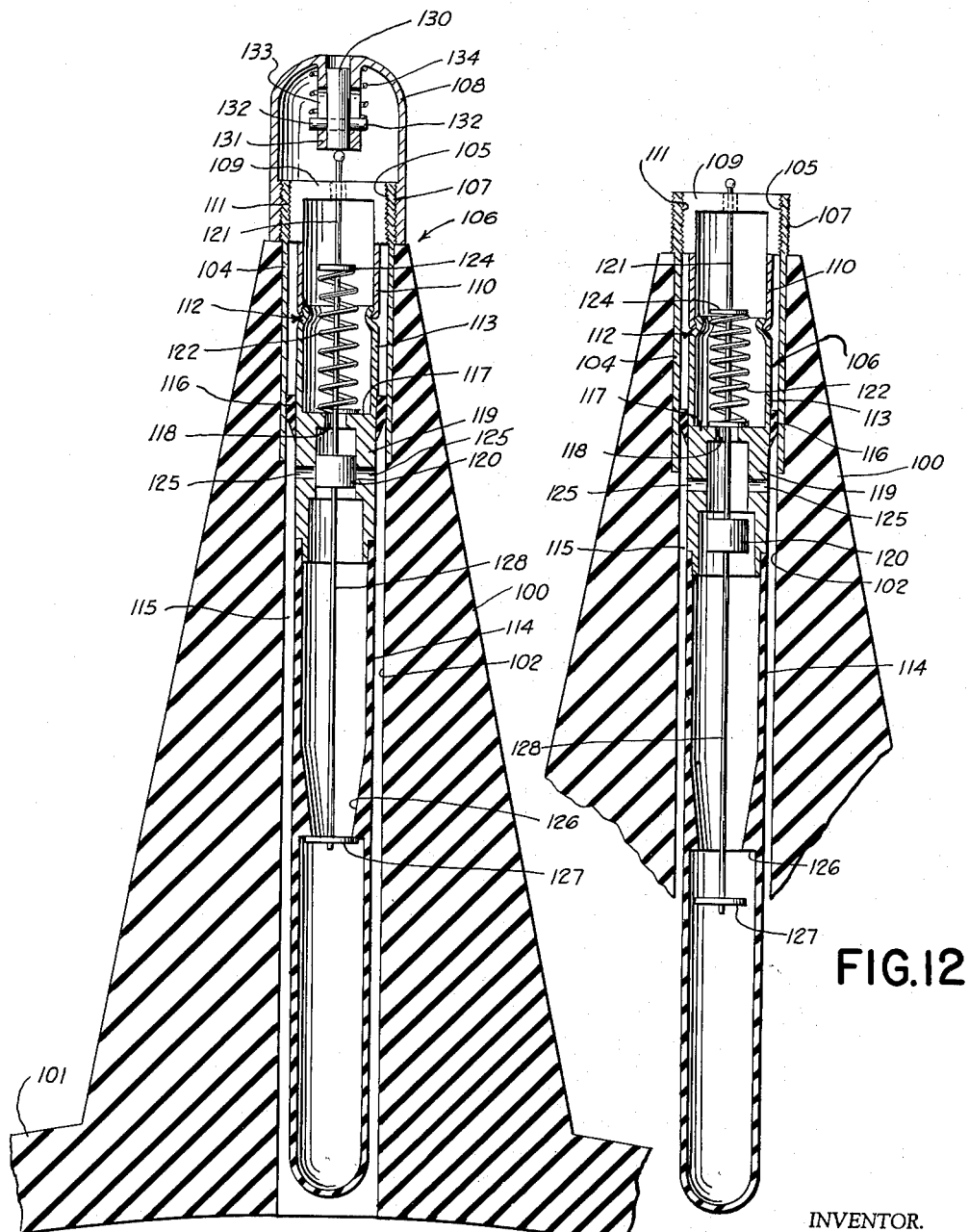
FIG. 11 is an enlarged vertical sectional view of another modified form of valve structure embodying the present invention and which is of the type which may be used to replace the conventional valve structure in a standard tubeless tire.
FIG. 12 is a view similar to FIG. 11 with the valve cap removed and indicating the valve parts in an open position as when the tire is being pressurized.

Referring more particularly to the drawings and to the form of tire valve structure shown in FIGS. 1–5, in FIG. 1 the valve structure is shown mounted on a pneumatic tire 15 through the provision of a member 16 provided with a flange 17 vulcanized to the tire, as shown, or the member 16 may be molded integrally with the tire. The member 16 is preferably tapered, as shown, formed of rubber, and provided with an axial opening 18 therethrough, the inner end of which communicates with the interior of the tire 15.

The valve structure of FIGS. 1 to 5 comprises a valve stem S constructed of metal and having an inner part 19 and an outer part 20. The two parts are fixedly connected one to the other at their confronting ends by an annular flange 21 on the inner part 19 and an annular groove 22 on the outer part 20 formed in an annular bead 23.

The outer part 20 of the stem is fixedly secured, by vulcanizing or otherwise, within the outer end of the member 16 where the opening 18 is reduced in diameter to provide an annular shoulder 24 which abuts the bead 23. The inner stem part 19 has an outside diameter less than that of the opening 18 so as to provide an intervening space that leads to the interior of the tire 15.

The inner stem part 19 is formed at its inner end to provide a cylinder 25, the inner end of which is formed with a transverse wall 26 provided with an air inlet port 27. The side wall of the cylinder is formed with one or more air outlet ports 28 which lead to the opening 18. Within the cylinder 25 is a piston valve 29 which is not only movable lengthwise within the cylinder to open or close the ports 27 and 28, but movable outwardly of the cylinder, as shown in broken lines in FIG. 2, to open all ports.

A rod 30 is mounted for axial movement in the stem S, its inner end extending through the port 27 and fixed to the piston valve 29. By means of a helical expansible spring 31 interposed between the wall 26 and a stop 32 fixed on the rod 30, the rod is urged outwardly to cause the piston valve 29 to occupy the position shown in FIG. 3 in which it closes the inlet port 27.

Within the outer portion of the stem part 20 a spider type guide frame 33 is fixed in the stem part by legs 34 welded to the interior thereof. This frame 33 is formed with a central opening through which the rod 30 can slide to allow the outer portion of the rod, which is formed with a terminal head 35 to occupy the completely projected position shown in FIG. 3, or the two retracted positions shown in solid and broken lines in FIG. 2.

On the inner end of the cylinder 25 is secured the open end of a bag or bladder 36 formed of elastic rubber or other suitable material, and in such manner as to form an airtight seal between the two. As shown, the bag 36 is preferably tapered in thickness for a major portion of its length and at the thickest end thereof it is abruptly reduced in thickness to form an annular shoulder 37 which provides a keeper for a latch member 38.

The latch member 38, as best shown in FIG. 5, is made up of radiating arms, and at its center is secured the inner end of a rod 39, the other end of the rod being fixed axially to the piston valve 29. It is important to note that the outside diameter of the bag 36 is less than the diameter of the opening 18, and that the length of the bag is such as to project into the tire 15. Thus, the bag is adapted to be completely exposed to the air pressure existing in the tire.

That portion of the stem part 20 projecting from the member 16 is exteriorly screw-threaded as indicated at 40 for attachment of a cap 41 thereto. This cap is of cup form with its outer end provided with an inwardly extending guide sleeve 42 terminating at its outer end in an annulus 43 provided with a conical seat 44.

A rod 45, having a conical head 46 on its outer end, is slidable in the sleeve 42 to occupy the projected position shown in FIG. 3 or a retracted position in which the head engages the seat 44. The rod 45 is urged to retracted position by a spring 47 mounted on the sleeve 42 and between the annulus 43 and a cross member 48 fixed to the rod.

The rod 45 and head 46 constitute the signaling means of my invention since when they are in projected position they indicate to the observer that the air pressure in the tire 15 has dropped below the pressure to which it was originally inflated. Conversely, when the signaling means is in retracted position it indicates that the air pressure in the tire is at the original pressure.

In operation of the foregoing valve structure, the tire 15 can be inflated to the desired pressure by first removing the cap 41 and the signaling member 46, and then applying a conventional air pressure supply nozzle (not shown) to the projecting portion of the stem part 20 in the usual manner. In so doing, the head end 35 of the rod 30 is engaged by the interior of the nozzle and pressed inwardly from the solid line position to the broken line position shown in FIG. 2.

Such movement of the rod 30, which is against the tension of the spring 31, moves the piston valve 29 from the solid line position to the broken line position shown in FIG. 2, thereby opening the ports 28. With these ports now open the air under pressure admitted to the stem S passes through the port 27 into the cylinder and then outwardly through the ports 28 into the opening 18 where it passes into the tire 15 for inflation thereof to the desired pressure, all as indicated by the arrows in FIG. 2. Simultaneously with such tire inflation, air passes around the valve 29 to inflate the bag 36 to the same degree of air pressure as now exists in the tire. Thus, with the two pressures equalized the bag maintains the form shown in FIG. 2.

Although the valve 29 in its movement out of the cylinder 25 has, through the rod 39, unseated the latch member 38 from the keeper 37, since the bag maintains its original form the latch member will reseat on the keeper once the valve moves back into the cylinder. The valve 29 is maintained in alignment with the cylinder 25 during its return movement by the rod 30 guided in the frame 33 and by the latch member 38 which cooperates with the interior walls of the uninflated bag 36 below the annular shoulder 37. Such movement of valve 29 occurs when the air supply nozzle is removed from the stem S to allow the spring 31 to return the valve to the solid line position shown in FIG. 2 as limited by the latch member 38 reseating on the keeper 37.

In this position of the valve 29, the ports 28 are closed so that the air pressures in the tire and the bag remain the same at least temporarily. So long as this condition exists the valve 29 remains in port closing position and, of course, escape of air to the atmosphere cannot occur because the ports 28 are out of communication with the port 27. Once the bag and the tire have been so inflated, the cap 41 is now applied to the stem S bringing the rod 45 as urged to retracted position by the spring 47, into contact with the head 35, but not moving rod 45 nor rod 30 from the position shown in FIG. 2.

Now when the air pressure in the tire decreases as a result of leakage in the tire itself, then the original and higher air pressure maintained in the bag 36 operates to expand the bag to a degree such that the keeper 37 will move laterally off of the latch member 38. This permits the latch member, under the expanding action of the spring 31, to move toward the mouth of the bag 36, resulting in the rod 39 moving the valve 29 against the cylinder wall 26 and closing the port 27, all as shown in FIG. 3. With closing of the port 27, air is prevented from escaping to the atmosphere through the valve structure and deflating the tire.

Under movement of the valve 29 to port closing position, rod 30 is actuated to push the rod 45 and the head 46 against the tension of spring 47 to the projected position shown in FIG. 3. Since the rod and head constitute the signaling means of my invention, once they are moved to projected position it will indicate to an observer that the air pressure in a tire has fallen below its original pressure, and that the tire should be reinflated to the proper pressure in order to prevent damage thereto. Such reinflation can be readily effected by removing the cap 41, the extreme projected position of the rod 30 not interfering with application of an air nozzle to the valve stem part 20, since it can be pushed back to the broken line position shown in FIG. 2 through such nozzle application.

Referring now to FIGS. 6, 7 and 8, I have here shown another form of valve structure embodying my invention, with the exception of the cap 41 and the pressure signaling means 45 and 46 which are identical to those shown in the first form of valve structure and obviously operate in the same manner when the cap is applied to the stem.

The valve structure of FIG. 6 is identical to that of FIG. 2 with certain exceptions as will appear from the following description: The latch member 38a is of disk form and the free end 37a of a metal sleeve 50 constitutes a keeper for the latch member.

The sleeve 50 is formed integral with the cylinder 25a, and it is divided longitudinally into two or more sections as best shown in FIG. 7. In the present instance, the sleeve is divided into four sections. Within the sleeve 50 is a bag or bladder 51 constructed of rubber or other suitable elastic material. The mouth of the bag is secured within a groove 52 formed in the cylinder 25a, while its closed end 51a is flat and clamped between the latch member 38a and a disk 53, both of which are fixed on the rod 39 as connected to the piston valve 29a.

In the operation of the valve structure of FIG. 6, the parts thereof occupy the solid line positions shown until an air pressure supply nozzle is applied to the stem part 20 for inflation of the tire when the rod 30 is forced inwardly against the tension of the spring 31 to move the piston valve 29a out of the cylinder 25a to the dotted line position shown. Under such valve movement the rod 39 is actuated to so move the disk 53 as to elongate the bag 51 to such an extent that the latch member 38a is unseated from the keeper 37a, all as shown in broken lines in FIG. 6.

Movement of the valve 29a also opens the ports 28 to allow air to be supplied to the bag 51 at the same pressure as the air in the tire. With these equalized pressures there is no expansion of the bag nor the sections of the sleeve 51 surrounding it.

Once the tire has been inflated to the desired pressure, the air supply nozzle is removed from the stem part 20, thus permitting the spring 31 to return the parts of the valve structure to the position shown in solid lines in FIG. 6, and wherein the latch member 38a is reseated on the keeper 37a and the ports 28 closed to maintain the air pressures both within the tire and the bag. This operation is, of course, followed by applying the cap 41 to the stem part 20 as in the first form of my invention. In this embodiment of the invention the valve 29a is maintained in alignment with its cylinder 25a during its return movement by the rod 30 guided in the member 33 and by the latch member 38a secured to the lower end of the elongated bag 51.

When the pressure of air within the tire drops to any appreciable extent the higher pressure of air in the bag 51 operates to expand the bag diametrically to force the sleeve sections outwardly one from the other at their free ends so that the latch member 38a is permitted to move off of the keeper 37a and into the sleeve as illustrated in FIG. 8. Under such movement of the latch member the rod 39 is moved accordingly to move the piston valve 29a to the position shown in FIG. 8, thereby closing the port 27. Under such movement of the piston valve the rod 30 is moved to the position shown in FIG. 3, and thus with the cap 41 applied to the stem part 20 such rod movement will operate to move the rod 45 to projected position, thus indicating drop of air pressure in the tire.

Referring now to FIGS. 9 and 10, a third form of valve structure embodying my invention is shown, and here again, without the cap 41 and the signaling means. This valve structure is identical to the valve structure shown in FIG. 2 with the exception that the bag, here indicated at 55, is constructed of spring metal, and there is a different form of latch means for the rod 39. The bag 55 is an integral part of the cylinder 25 and between its ends it is formed with a pair of normally arcuate or concave parts 56 formed on their confronting sides with a pair of keepers 57 for a latch member 58 of conical form which is fixed to the end of the rod 39. In practice when the tire is inflated the valve 29 is moved out of its cylinder 25 and is maintained in alignment with the cylinder during the return movement by the rod 30 guided in the member 33 and the rod 39 guided between the keepers 57.

It will be understood that from the descriptions of the preceding forms of valve structures that when the pressure of air in the tire drops below that in the bag 55, the higher air pressure in the bag operates to so expand the bag parts 56 as to move the keepers 57 free of the latch member 58, thereby allowing the rod 30 to be moved by the spring 31 to force the indicating rod 45 to projected position on the cap 41.

Figure 13:
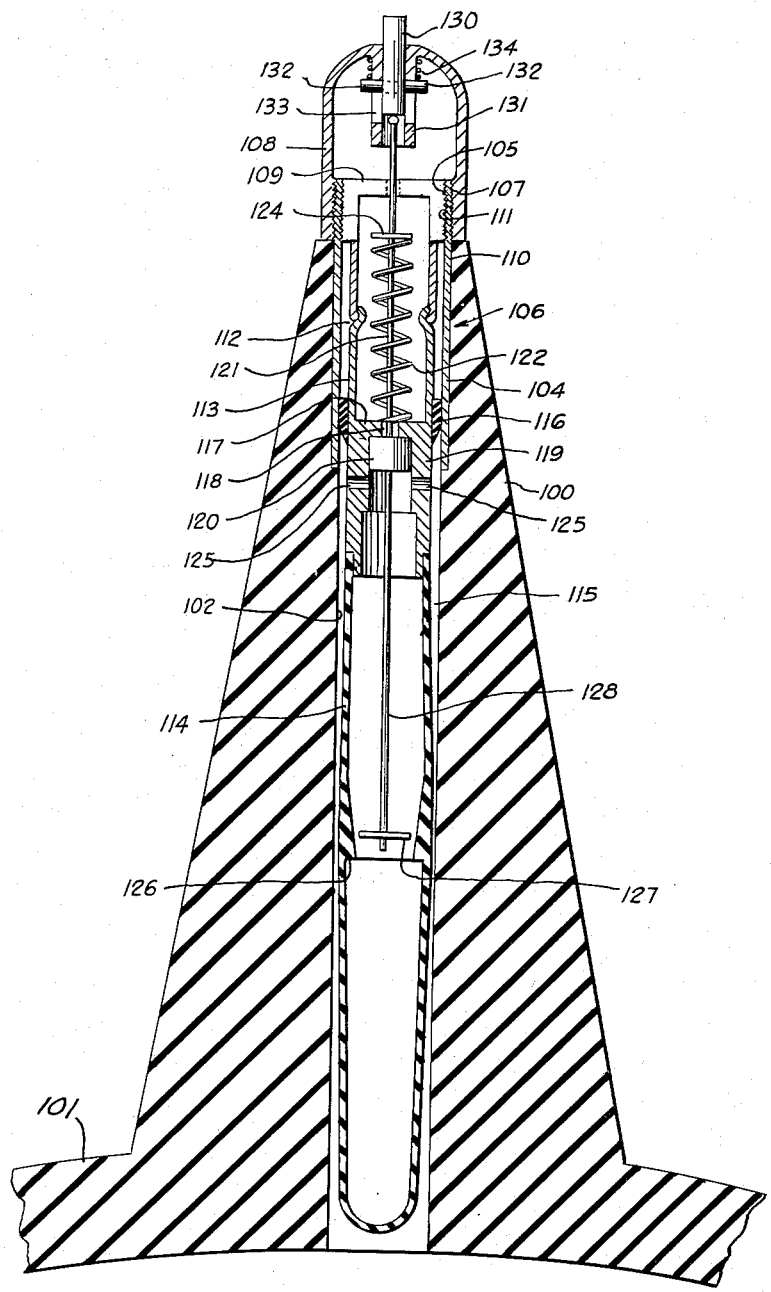
FIG. 13 is a view similar to FIG. 11 showing the valve parts in a position indicating that the pressure in the tire is below the desired pressure as initially applied.

While the present valve structures thus far illustrated and described may be adapted for use with an inner tube or with a tubeless tire, it will be apparent that such valve structures may be modified to be interchangeable with a conventional tire valve in a manner such as is illustrated in a further modified form of the invention shown in FIGS. 11, 12 and 13. The modified structure is particularly designed for replacement of the conventional valve structure or core now used and which may be supported in a standard nipple formed integrally with a tubeless tire.

As shown in FIG. 11, a standard supporting nipple indicated at 100 and extended from the tire 101 is provided with an axial opening 102 therein communicating with the interior of the tire, the axial opening being provided with an elongated tubular metal sleeve or bushing 104 molded or otherwise secured therewithin. The sleeve 104 extends upwardly beyond the upper end of the nipple and is provided with an interiorly threaded portion 105 for the reception of a valve member or "core" indicated generally at 106 and is also provided with an exteriorly threaded portion 107 for the reception of a valve cap 108. The present novel valve structure 106 is designated for interchangeability with a standard valve core and includes an upper portion similar in some respects to the conventional tire valve, herein shown as comprising a tubular metal member 110 having a threaded portion 111 at its upper end and a spun coupling connection 112 at its lower end for cooperation with the upper end of a lower tubular member 113. The coupling connection 112 is provided to permit rotation of the member 110 relative to the member 113 when the valve is inserted. The threaded portion 111 is formed on opposed sides of a flat, inverted U-shaped portion 109 formed integrally with the sleeve 110 and is designed to receive a slotted tool to effect rotation of the assembled unit when inserting the valve member in the usual manner.

The lower end of the member 113 has connected thereto, in airtight sealing relation, the mouth portion of an elongated resilient expansible bag or bladder 114 closed at its lower end and which is of a smaller outside diameter than the diameter of the axial opening 102 whereby to provide an annular space 115 to permit expansion of the bag therein. The member 113 is further provided with an annular sealing ring 116 secured thereto for cooperation with the wall of the axial opening 102 to seal off the escape of air upwardly through said annular space 115.

The lower member 113 is further provided with a transverse wall 117 having an air inlet port 118 therein for cooperation with a piston valve 120 which operates in a cylinder 119, also formed in the member 113. As herein illustrated, the piston valve 120 is provided with a rod 121 extended upwardly therefrom, through the port 118 and through an opening in the cross bar of the U-shaped portion 109. A spring 122 coiled about the rod 121 is interposed between the transverse wall 117 and a stop collar 124 fixed on the rod 121 to normally urge the piston valve upwardly. The side wall of the cylinder is formed with air outlet ports 125 communicating with the opening 102. Intermediate its ends, the expansible bag 114 is provided with an interior shouldered portion 126 providing a keeper for a latch member 127 fastened to the lower end of a rod 128 secured to and depending from the underside of the piston 120.

From the description thus far it will be seen that the latch member 127 in cooperation with the keeper 126 maintains the valve member 120 in the position illustrated in FIG. 11 wherein the ports 125 are closed, and that when the tire is pressurized in the usual manner, the piston is urged downwardly beyond the cylinder 119 to the position shown in FIG. 12, the air entering the inlet 118 and passing through the ports 125 and through the annular space 115 to the interior of the tire, and also passing through the cylinder 119 and around the piston 120 into the bag 114. As a result, the pressure in the expansible bag 114 and in the tire is equal, and when the pressurized air supply hose is removed the piston valve returns to the position shown in FIG. 11, closing the ports 125, to maintain such pressures in the tire and in the expansible bag. The valve 120 is maintained in alignment with its cylinder 119 by the rod 121 which is slidably guided in a bushed opening in the guide portion 109 and by the keeper 127 which may cooperate with the walls of the uninflated bag 114.

The signaling device carried by the cap member 108 may be similar to that shown in FIG. 3 and, as shown in FIG. 11, includes a signaling member 130 mounted for vertical sliding movement in a depending tubular portion 131 formed integrally with the cap. The member 130 is provided with a cross pin forming opposed lateral extensions 132 received in vertical slots 133 formed in the tubular portion 131 and is normally urged downwardly by a coil spring 134 to engage the extensions with the bottom of the slot and to dispose the signaling member 130 in a retracted position, as shown in FIG. 11, wherein the lower end of the member 130 engages the upper end of the piston valve rod 121 when the cap is applied as shown.

In the operation of the modified valve structure shown in FIGS. 11, 12 and 13 it will be seen that when the pressure in the tire falls below the inserted pressure the initially applied pressure maintained in the bag 114 permits expansion of the bag to release the latch 127 from the keeper 126 whereupon the rod 121 is urged upwardly by the spring 122 to effect projection of the signaling member 130 to the position shown in FIG. 13, the piston valve 120 moving to a position to close the inlet opening 118. Projection of the signaling member will indicate to the observer that the tire pressure has fallen below its original pressure and requires reinflation to the desired pressure.

The expansible bag 114 may comprise any suitable resilient material, such as a rubber or plastic material, having sufficient rigidity to maintain the piston valve assembly in its normally latched position shown in FIG. 11 and also having sufficient elasticity to permit radially outward expansion when a pressure difference occurs, as described, and to permit return of the bag to its initial position when the latch is reset by reinflation of the tire. In practice the signaling member 130 may comprise a colored plastic material, such as a red plastic material, to more readily call the operator's attention to the low pressure condition of his tires. It will be apparent that the modified valve structure illustrated in FIGS. 11, 12 and 13 designed for use with a standard air inlet nipple of a conventional tire is of great advantage in that the present valve core and signal carrying cap may replace the standard valve core and cap without modifying the standard tire inlet structure. In the event that the valve cap and the indicating means carried thereby is lost, it will be apparent that the extension of the upwardly extended valve rod beyond its normal extension when the latch is released will likewise serve to indicate that the pressure in the tire has been reduced below that originally inserted, and requires reinflation. Hence, the present invention further contemplates a valve structure without the cap member and its indicating means.

Although I have herein shown and described only four forms of pneumatic tire valve structures, each embodying my invention, it is to be understood that various changes and modifications may be made therein without departing from the spirit of the invention and the spirit and scope of the appended claims. It is further contemplated that the scope of the present invention be not limited for use with pneumatic tires since the present invention may be used with equal advantage for signaling a reduction in pressure from a predetermined value in any expansible chamber.

Having thus described the invention, what is claimed is:

1. A valve structure for an inflatable tire, including: a tubular stem having passage means therethrough adopted to communicate with the interior of a tire; a movable valve member in said stem, said valve member having two positions whereat fluid flow through said stem is prevented and a third position for opening said passage; yielding means urging said valve member to one of said two position; a cap removably attached to the outer end of said valve stem; an indicator device carried by said cap actuatable by said valve member when urged to said one position by said yieldable means; and an expansible member secured to said stem and including holding means for releasably securing said valve member in the other of said two positions, said expansible element being exteriorly exposed to pressure within said passage means, the interior of said expansible element being provided with the same pressure as the passage means when the valve member is in its third position, said expansible element being adapted to expand when the pressure exteriorly thereof drops below a predetermined value to thereby actuate said holding means to release said movable valve member for movement to said one position and to actuate the indicator of the cap to signal a lowering of the pressure below said predetermined value.

2. A valve structure for an inflatable tire, including: a valve stem having passage means therethrough adapted to communicate with the interior of a tire; a hollow expansible element having the interior thereof adapted for connection with said passage means; a movable valve assembly including a valve member movable to two positions whereat flow through said passage means is cut off and movable to a third position whereat fluid from said passage means will enter the interior of said expansible element, said expansible element including holding means for releasably retaining the valve member in one of said closed positions; a valve cap removably attached to the free end of said valve stem; indicator means incorporated in said cap actuatable by said movable valve assembly; and yieldable means urging said valve assembly to the other of said closed positions whereat a part of said indicator is moved to a position indicating a drop in pressure in said passage means below a predetermined value, said expansible element adapted to actuate said holding means by expanding to release said valve member when the pressure drops below said predetermined value.

3. A valve structure for an inflatable tire, including: a valve stem having passage means therethrough adapted to communicate with the interior of a tire; an expansible element adapted to be subjected to pressure within said passage means; a movable valve assembly including a valve member controlling flow through said passage means and movable to two positions whereat flow through said passage means is closed and to a third position to open said passage means, said expansible element including holding means normally retaining the valve member in one of said closed positions; indicator means incorporated in said valve structure actuatable by said movable valve member; and yieldable means urging said valve assembly to said second closed position to actuate said indicator to signal a drop in pressure in said passage means below a predetermined pressure, said expansible element adapted to actuate said holding means releasing said valve member for movement to the last-mentioned valve closed position when the pressure drops below said predetermined pressure.

4. A valve structure for an inflatable tire, including: a valve stem having passage means therethrough adapted to communicate with the interior of a tire; an expansible element adapted to be subjected to pressure within said passage means; a movavle valve assembly including a valve member controlling flow through said passage means and movable to two positions whereat flow through said passage means is closed and to a third position to open said passage means, said expansible element including holding means for normally retaining the valve member in one of said closed positions; indicator means incorporated in said valve structure actuatable by said movable valve assembly; and yieldable means urging said valve assembly to said second closed position whereat said indicator is actuated to signal a drop in pressure in said passage means below a predetermined pressure, said expansible element adapted to actuate said holding means thereby releasing said valve structure for movement to the last-mentioned position when the pressure drops below said predetermined pressure.

5. A valve structure for an inflatable tire, including; a valve stem having passage means therethrough adapted to communicate with the interior of a tire; a resilient hollow expansible element having the interior thereof connected with said passage means; a shoulder on the interior of said element; a movable valve assembly including a valve member and a rod, said valve member being movable to two positions whereat flow through said passage is cut off and movable by entering air flow to a third position so that fluid from said passage means will enter the interior of said expansible element, and said rod will be moved to a position for engagement with said shoulder of said expansible element to retain the valve member in one of said closed positions; a valve cap removably attached to the free end of said valve stem; indicator means incorporated in said cap; and yieldable means urging said valve assembly to the other of said closed positions whereat said indicator is moved to a position indicating a drop in pressure below a predetermined value in said passage means, said expansible element adapted to expand to disengage said shoulder from said rod when the pressure within the passage means drops below said predetermined value.

6. A valve structure for an inflatable tire, including: a tubular stem having passage means therethrough adapted to communicate with the interior of a tire; a movable valve member in said stem, said valve member having a closed position whereat fluid flow through said stem is prevented; a cap attached to the outer end of said valve stem; an indicator device carried by said cap actuatable by said movable valve member; an expansible member secured to said stem and including holding means for releasably securing said valve member in said closed position, said expansible element being exteriorly exposed to pressure within said passage means, the interior of said expansible element being provided with the same pressure as the pressure in the passage means when the valve member is in an open position, said expansible element being adapted to expand when the pressure exteriorly thereof drops below a predetermined value to thereby actuate said holding means to release said movable valve member; and yieldable means urging said valve member outwardly, when released by said expansible element, to actuate said indicator to signal a lowering of the pressure below said predetermined value.

7. A valve structure for an inflatable tire, including: a valve stem having passage means therethrough adapted to communicate with the interior of a tire; an elongated expansible bag having the interior thereof connected with said passage means; a movable valve assembly including a valve member and a rod therefor, said valve member having two valve closed positions whereat flow through said passage means is cut off and movable by the pressure of entering air to a third position whereat fluid from said passage means will enter the interior of said bag; a metal sleeve about said bag, said sleeve having one end secured to said stem and the other end open, said sleeve also being split longitudinally from said open side to provide a plurality of segments, the free ends of which are movable outwardly; a disk on said valve rod engageable by the free ends of said segments when the latter are in their normal position; a valve cap removably attached to the free end of said valve stem; indicator means incorporated in said cap actuatable by said movable valve member; and yieldable means urging said valve assembly to the other of said closed positions whereat said indicator is moved to a position indicating a drop in pressure below a predetermined value, said expansible element adapted to expand to move the free ends of said sleeve segments outwardly to release said disk when the pressure exteriorly of said expansible element drops below said predetermined value.

8. A valve structure for an inflatable tire, including: a valve stem having passage means therethrough adapted to communicate with the interior of a tire; a tubular resilient sleeve having one end secured to said stem and having the other end open and split longitudinally to provide a plurality of segments, the free end portions of which are movable radially outwardly; an expansible element within said sleeve and adapted to move the free end portions of said segments outwardly when said element expands, said element being subjected to pressure within said passage means; a movable valve assembly including a valve member controlling flow through said passage means, said valve member being movable to two positions whereat flow through said passage means is closed and movable to a third position to open said valve, said assembly including a rod and a disk thereon adapted to be normally engaged by the free ends of said segments and retain said valve member in one of said valve closed positions; indicator means incorporated in said valve structure; and yieldable means urging said valve assembly to said second closed position whereat said indicator signals a drop in pressure below a predetermined value, said expansible element adapted to expand when the pressure exteriorly thereof drops below said predetermined pressure.

9. A valve structure for an inflatable tire, including: a valve stem having passage means therethrough adapted to communicate with the interior of a tire; an elongated hollow expansible element formed of thin metal and having the interior thereof connected with said passage means, said element having opposite inwardly extending concave sides with inwardly extending shoulders spaced apart from each other and adapted to move further apart under expansion of said element; a movable valve member movable to two positions whereat flow through said passage means is cut off and movable to a third position whereat fluid from said passage means will enter the interior of said expansible element; a depending rod carried by said valve element, said rod having a conical latch element on the free end thereof with the point at the bottom and engageable by said shoulders for retaining the valve member in one of said closed positions; a valve cap removably attached to the free end of said valve stem; indicator means incorporated in said cap actuatable by said movable valve member; and yieldable means urging said valve member to the other of said closed positions whereat said indicator is moved to a position indicating a drop in pressure below a predetermined value, said expansible element adapted to expand to release said latch element when the pressure exteriorly thereof drops below said predetermined value.

10. A valve structure for an inflatable tire, including: a valve stem having passage means therethrough adapted to communicate with the interior of a tire; a thin walled, hollow expansible, element adapted to be subjected exteriorly to pressure within said passage means, and interiorly to a normal fluid pressure of substantially the same value as the pressure within said passage means, said element being of metal with inwardly extending opposed walls having oppositely arranged adjacent shoulders; a movable valve member controlling flow through said passage means and movable to two positions whereat flow through said passage means is closed and to a third position to open the passage means; a rod carried by said valve member; a latch member at the free end of said rod, said latch member being normally engaged by said shoulders to retain the valve member in a valve closed position; indicator means incorporated in said valve structure; and yieldable means urging said valve member from one of said closed positions to the other of said closed positions whereat said indicator signals a drop in pressure below a predetermined value, said expansible element adapted to release said latch member to permit movement of the valve member to the last-mentioned position when the pressure in said passage means drops below said predetermined pressure.

11. A valve assembly having passage means therethrough and adapted to be secured to and communicate with the air inlet portion of an inflatable tire comprising: an air inlet member, an expansible member secured to said air inlet member, said inlet member having an inlet port and outlet ports in communication with the passage means, an outwardly spring pressed valve member for cooperation with said ports, said valve member being movable to a position opening said ports and also movable from a position closing said outlet ports to a position closing said inlet port, said passage means and said expansible member being pressurized to equal pressures through said ports, latch means operatively connected to said valve member cooperating with a keeper controlled by said expansible member and arranged to normally maintain the valve member in a position to close said outlet ports whereby to independently maintain the pressures in said passage means and in said expansible member, an upwardly projecting member extending from said valve member adapted to be depressed to open said ports, said expansible member being adapted to expand to release said latch when the pressure in said passage means falls below a predetermined value whereby to extend the projectable member beyond its normal extension, thus indicating a drop in pressure below said predetermined value.

12. A valve unit having a passage means therethrough and adapted to be secured to and communicate with the air inlet portion of an inflatable tire comprising: an air inlet member, an expansible member secured to said air inlet member, said inlet member having an inlet port and outlet ports in communication with the passage means, an outwardly spring pressed valve member for cooperation with said ports, said valve member being movable to a position opening said ports and also movable from a position closing said outlet ports to a position closing said inlet port, said passage means and said expansible member being pressurized to equal pressures through said ports, latch means operatively connected to said valve member and cooperating with a keeper controlled by said expansible member and arranged to normally maintain the valve member in a position to close said outlet ports whereby to independently maintain the pressures in the passage means and in the expansible member, an upwardly extended member secured to and movable with said valve member and adapted to be depressed to open said ports, a cap removably secured to said inlet portion, an indicator device carried by said cap and cooperating with said upwardly extended member, said latch being released to permit upward movement of the spring urged valve member when the pressure in the passage means falls below the pressure originally inserted, effecting expansion of said expansible member, the upward movement of the spring urged valve member actuating said indicating device to apprise the operator of such reduction in pressure.

13. A valve unit as defined in claim 12 wherein the air inlet member is exteriorly threaded and the cap member is interiorly threaded for cooperation with the interiorly and exteriorly threaded portions respectively of a bushing provided in the air inlet nipple of an inflatable tire whereby to permit the present valve unit and cap to replace the conventional valve unit and cap removed therefrom.

References Cited in the file of this patent

UNITED STATES PATENTS

| | | |
|---|---|---|
| 1,044,779 | Hackley | Nov. 19, 1912 |
| 1,061,472 | Hackley | May 13, 1913 |
| 1,328,572 | Lees | Jan. 20, 1920 |

FOREIGN PATENTS

| | | |
|---|---|---|
| 163,298 | Austria | June 10, 1949 |